US012646176B2

(12) United States Patent
Liu et al.

(10) Patent No.: US 12,646,176 B2
(45) Date of Patent: Jun. 2, 2026

(54) TRANSFORMER-BASED IMAGE SEGMENTATION ON MOBILE DEVICES

(71) Applicant: Adobe Inc., San Jose, CA (US)

(72) Inventors: Jingyuan Liu, Santa Clara, CA (US); Qing Liu, Santa Clara, CA (US); Jimei Yang, Merced, CA (US); Yuhong Wu, Sammamish, WA (US); Su Chen, San Jose, CA (US)

(73) Assignee: Adobe Inc., San Jose, CA (US)

( * ) Notice: Subject to any disclaimer, the term of this patent is extended or adjusted under 35 U.S.C. 154(b) by 634 days.

(21) Appl. No.: 18/170,336

(22) Filed: Feb. 16, 2023

(65) Prior Publication Data

US 2024/0281978 A1 Aug. 22, 2024

(51) Int. Cl.
| | |
|---|---|
| *G06T 7/11* | (2017.01) |
| *G06V 10/26* | (2022.01) |
| *G06V 10/77* | (2022.01) |
| *G06V 10/82* | (2022.01) |
| *G06V 20/70* | (2022.01) |

(52) U.S. Cl.
CPC .............. *G06T 7/11* (2017.01); *G06V 10/267* (2022.01); *G06V 10/7715* (2022.01); *G06V 10/82* (2022.01); *G06V 20/70* (2022.01); *G06T 2207/20021* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2021/0365717 A1* | 11/2021 | Cao | ........................ | G06T 7/0012 |
| 2022/0044407 A1* | 2/2022 | Liu | ........................... | G06T 7/11 |

(Continued)

FOREIGN PATENT DOCUMENTS

| | | | | | |
|---|---|---|---|---|---|
| CN | 113920099 A | * | 1/2022 | ............. | G06N 3/045 |
| CN | 114743103 A | * | 7/2022 | ............. | G06N 3/045 |
| CN | 114882599 A | * | 8/2022 | ....... | G06F 18/23213 |

OTHER PUBLICATIONS

Xu, X.—"MulTNet: A Multi-Scale Transformer Network for Marine Image Segmentation toward Fishing"—Sensors Sep. 23, 2022—pp. 1-17 (Year: 2022).*

(Continued)

*Primary Examiner* — Bernard Krasnic
(74) *Attorney, Agent, or Firm* — Keller Preece PLLC

(57) ABSTRACT

The present disclosure relates to systems, non-transitory computer-readable media, and methods for generating segmentation masks for a digital visual media item. In particular, in one or more embodiments, the disclosed systems generate, utilizing a neural network encoder, high-level features of a digital visual media item. Further, the disclosed systems generate, utilizing the neural network encoder, low-level features of the digital visual media item. In some implementations, the disclosed systems generate, utilizing a neural network decoder, an initial segmentation mask of the digital visual media item from the low-level features. Moreover, the disclosed systems generate, utilizing the neural network decoder, a refined segmentation mask of the digital visual media item from the initial segmentation mask and the high-level features.

20 Claims, 11 Drawing Sheets

(56) References Cited

U.S. PATENT DOCUMENTS

2022/0198209 A1* 6/2022 Spears ................. G06V 10/454
2023/0334813 A1* 10/2023 Spears ............... G06F 18/2413

OTHER PUBLICATIONS

Zhang, G.—"RefineMask: Towards High-Quality Instance Segmentation with Fine-Grained Features"—CVPR 2021—pp. 6861-6869 (Year: 2021).*

Li, Z.—"MaIL: A Unified Mask-Image-Language Trimodal Network for Referring Image Segmentation"—arXiv—Nov. 25, 2021—pp. 1-10 (Year: 2021).*

Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16x16 words: Transformers for image recognition at scale. Proc. Int. Conf. Learn. Representations, 2021.

Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In Int. Conf. Comput. Vis., pp. 1314-1324, 2019.

Bolei Zhou, Hang Zhao, Xavier Puig, Sanja Fidler, Adela Barriuso, and Antonio Torralba. Scene parsing through ade20k dataset. In Proc. IEEE Conf. Comp. Vis. Patt. Recogn., 2017.

Deng, Jia, et al. "Imagenet: A large-scale hierarchical image database." 2009 IEEE conference on computer vision and pattern recognition. Ieee, 2009.

Mark Sandler, Andrew Howard, Menglong Zhu, Andrey Zhmoginov, and Liang-Chieh Chen. Mobilenetv2: Inverted residuals and linear bottlenecks. In IEEE Conf. Comput. Vis. Pattern Recog., pp. 4510-4520, 2018.

Sachin Mehta and Mohammad Rastegari. Mobilevit: Light-weight, general-purpose, and mobile-friendly vision trans-former. arXiv preprint arXiv:2110.02178, 2021.

Wenhai Wang, Enze Xie, Xiang Li, Deng-Ping Fan, Kaitao Song, Ding Liang, Tong Lu, Ping Luo, and Ling Shao. Pyramid vision transformer: A versatile backbone for dense prediction without convolutions. Int. Conf. Comput. Vis., 2021.

Xiangxiang Chu, Zhi Tian, Yuqing Wang, Bo Zhang, Haibing Ren, Xiaolin Wei, Huaxia Xia, and Chunhua Shen. Twins: Revisiting the design of spatial attention in vision transformers. arXiv:2104.13840, 2021.

Xie, Enze, et al. "SegFormer: Simple and efficient design for semantic segmentation with transformers." Advances in Neural Information Processing Systems 34 (2021): 12077-12090.

Yinpeng Chen, Xiyang Dai, Dongdong Chen, Mengchen Liu, Xiaoyi Dong, Lu Yuan, and Zicheng Liu. Mobile-former: Bridging mobilenet and transformer. arXiv preprint arXiv:2108.05895, 2021.

Yuhui Yuan, Rao Fu, Lang Huang, Weihong Lin, Chao Zhang, Xilin Chen, and Jingdong Wang. Hrformer: High-resolution transformer for dense prediction. arXiv preprint arXiv:2110.09408, 2021.

Ze Liu, Yutong Lin, Yue Cao, Han Hu, Yixuan Wei, Zheng Zhang, Stephen Lin, and Baining Guo. Swin transformer: Hierarchical vision transformer using shifted windows. Int. Conf. Comput. Vis., 2021.

Zhang, Wenqiang, et al. "TopFormer: Token Pyramid Transformer for Mobile Semantic Segmentation." Proceedings of the IEEE/CVF Conference on Computer Vision and Pattern Recognition. 2022.

* cited by examiner

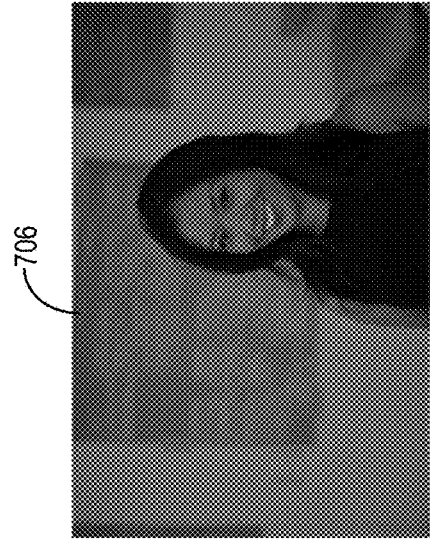
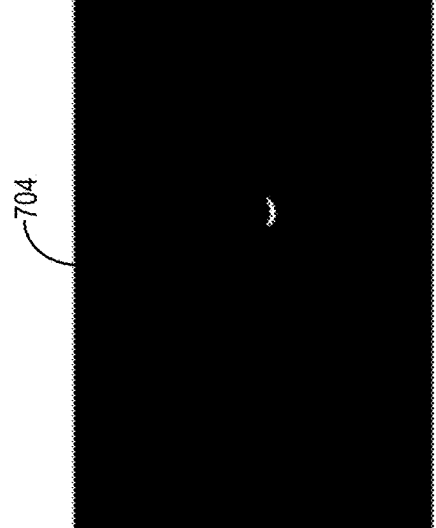
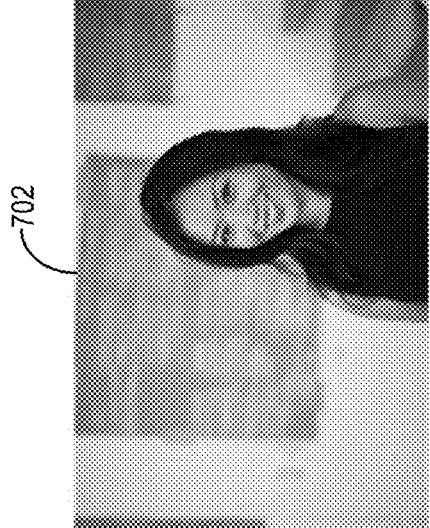
*Fig. 7*

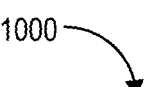

1000

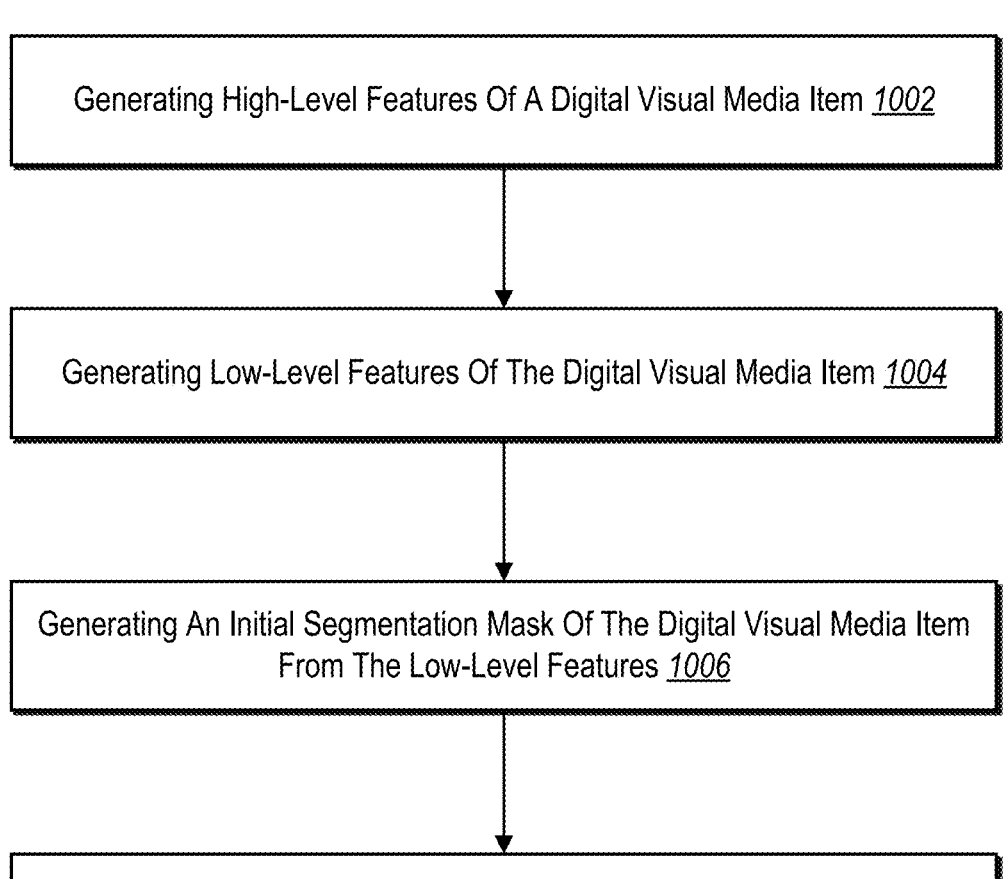

Generating High-Level Features Of A Digital Visual Media Item *1002*

Generating Low-Level Features Of The Digital Visual Media Item *1004*

Generating An Initial Segmentation Mask Of The Digital Visual Media Item From The Low-Level Features *1006*

Generating A Refined Segmentation Mask Of The Digital Visual Media Item From The Initial Segmentation Mask And The High-Level Features *1008*

*Fig. 10*

TRANSFORMER-BASED IMAGE SEGMENTATION ON MOBILE DEVICES

BACKGROUND

Recent years have seen developments in hardware and software platforms implementing digital image segmentation processes. For example, conventional segmentation systems analyze digital images to create segmentation masks. To illustrate, conventional segmentation systems classify various objects within a digital image and create masks for those various objects. Despite these developments, conventional systems suffer from a number of technical deficiencies, including inefficiency by utilizing excessive time and computing resources, and inaccuracy by generating unrealistic and imprecise segmentation masks.

BRIEF SUMMARY

Embodiments of the present disclosure provide benefits and/or solve one or more problems in the art with systems, non-transitory computer-readable media, and methods for segmenting digital images utilizing lightweight, transformer-based segmentation models. For example, in some embodiments, the disclosed systems utilize two segmentation heads: a first segmentation head to generate an initial segmentation mask for a digital image and a second segmentation head to generate a refined segmentation mask for the digital image. In some implementations, the disclosed systems generate from low-level features of the digital image, without high-level features of the digital image, the initial segmentation mask utilizing the first segmentation head. Also, in some embodiments, the disclosed systems generate the refined segmentation mask from high-level features of the digital image and the initial segmentation mask utilizing the second segmentation head. Moreover, in some implementations, the disclosed systems utilize a series sum operation to combine features (e.g., low-level and/or high level). Utilizing the techniques described herein, in some embodiments, the disclosed systems increase accuracy of segmentation masks and decrease required memory to perform the segmentation.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 7 illustrates an example digital visual media item, a corresponding ground truth feature refinement segmentation mask for the digital visual media item, and a corresponding feature refinement segmentation mask for the digital visual media item in accordance with one or more embodiments.

FIG. 10 illustrates a flowchart of a series of acts for generating segmentation masks for a digital visual media item in accordance with one or more embodiments.

DETAILED DESCRIPTION

Figure 1:
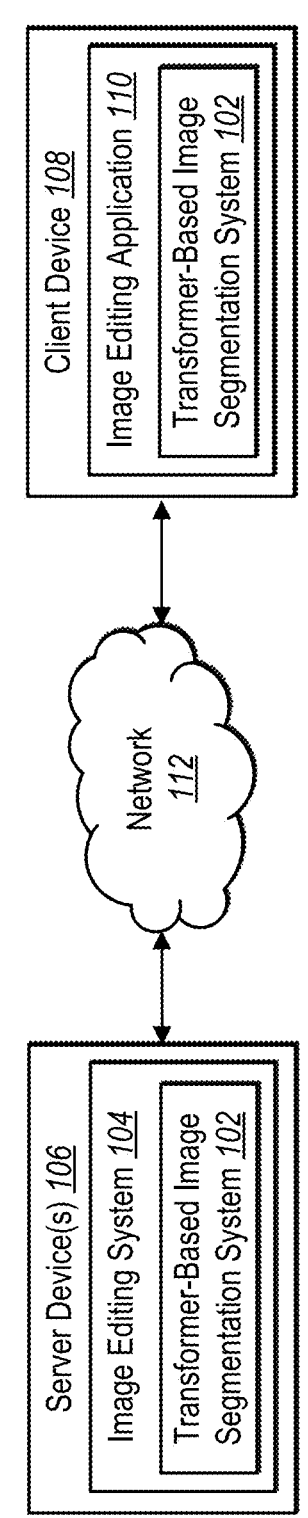
FIG. 1 illustrates a diagram of an environment in which a transformer-based image segmentation system operates in accordance with one or more embodiments.

This disclosure describes one or more embodiments of a transformer-based image segmentation system that segments digital visual media items utilizing lightweight, transformer-based segmentation models. For example, in some embodiments, the transformer-based image segmentation system utilizes an initial segmentation head to generate an initial segmentation mask for a digital visual media item. The transformer-based image segmentation system utilizes a refinement segmentation head to generate a refined segmentation mask for the digital visual media item. The transformer-based image segmentation system utilizes low-level features of the digital image to generate the initial segmentation mask. The transformer-based image segmentation system utilizes high-level features of the digital visual media item and the initial segmentation mask to generate the refined segmentation mask.

To illustrate, the transformer-based image segmentation system leverages full resolution features of the digital visual media item for segmentation of smaller objects and finer details yet improves upon model size and memory usage with respect to conventional systems, by utilizing a mobile-friendly transformer model with two or more segmentation heads. By focusing a first segmentation head on low-resolution features of the digital visual media item and the second segmentation head on high-resolution features of the digital visual media item, the transformer-based image segmentation system generates segmentation masks (including refined segmentation masks) that are realistic and precise for various smaller objects (e.g., skin, eyes, teeth, hair) with finer details in the digital visual media item.

Additionally, in some embodiments, the transformer-based image segmentation system trains a segmentation refinement neural network utilizing a combination of cross entropy and dice loss. Furthermore, the transformer-based image segmentation system has a reduced embedding dimension over conventional systems. In some implementations, the transformer-based image segmentation system utilizes a series sum in connection with one or more of the segmentation heads. In some cases, the series sum yields an increase in efficiency of the segmentation refinement neural network, without harming the accuracy of the segmentation masks.

Moreover, in some embodiments, the transformer-based image segmentation system utilizes a unified training strategy or an additional segmentation head to facilitate analyzing data having annotations different from the training datasets. In this way, the transformer-based image segmentation system is extensible to more semantic classes for digital visual media items and is able to utilize more broad datasets to perform image segmentation.

In addition, the transformer-based image segmentation system is suitable for continuous learning. For example, for new datasets, the transformer-based image segmentation system evaluates and splits the datasets into training and testing subsets based on complexity distributions to make the test sets representative of real-world cases. For instance, the transformer-based image segmentation system includes both challenging and easy digital images in both the training subset and the testing subset.

Despite recent developments with conventional systems performing object masking for digital images, conventional systems suffer from a number of technical deficiencies in relation to efficiency and accuracy. For example, conventional systems often inefficiently analyze and segment digital images. Specifically, conventional systems utilize excessive time and computing resources, rendering them unsuitable for use on mobile devices. Indeed, conventional systems often inaccurately analyze and segment digital images, particularly on mobile devices that have limited computing resources.

The transformer-based image segmentation system disclosed herein provides a variety of advantages relative to conventional systems. For example, by separating low-level features of a digital visual media item as inputs to a first segmentation head and high-level features of the digital visual media item as inputs to a second segmentation head, the transformer-based image segmentation system improves efficiency relative to conventional systems. Specifically, the transformer-based image segmentation system reduces memory required to generate an initial segmentation mask, including reducing overall memory required to generate the final (e.g., refined) segmentation mask. Further, by omitting the high-level features from the first segmentation head, the transformer-based image segmentation system reduces the size of the tensor in the first segmentation head, thereby reducing the computing resources (e.g., time, bandwidth, memory) required to process the tensor and generate the segmentation masks. Additionally, in some cases, the transformer-based image segmentation system combines features of the digital visual media item using a series sum operation, which consumes less memory than conventional feature combination operations.

Moreover, by generating an initial segmentation mask and then generating a refined segmentation mask, the transformer-based image segmentation system increases accuracy relative to conventional systems. Specifically, by focusing attention of the first segmentation head on low-level features of the digital visual media item, and by focusing attention of the second segmentation head on high-level features of the digital visual media item, the transformer-based image segmentation system generates realistic and precise segmentation masks. Indeed, the transformer-based image segmentation system is able to generate accurate masks even for small features of the digital visual media item such as hair in a portrait.

As such, in one or more embodiments, the transformer-based image segmentation system improves computational efficiency. In particular, the transformer-based image segmentation system utilizes one or more neural networks that are much smaller and/or less computationally intensive, than conventional segmentation models. Indeed, as a result of this improved computational efficiency, the transformer-based image segmentation system is able to be deployed more flexibly on a variety of computing devices. For instance, as mentioned above, the transformer-based image segmentation system, and the neural network(s) thereof, are able to be executed directly on a mobile device with limited memory and processing power (such as a smartphone or tablet). Thus, although conventional systems often require high-powered servers or other computing devices to operate, the transformer-based image segmentation system allows mobile devices to accurately and efficiently segment objects portrayed in digital images.

Additional detail will now be provided in relation to illustrative figures portraying example embodiments and implementations of a transformer-based image segmentation system. For example, FIG. 1 illustrates a system 100 (or environment) in which a transformer-based image segmentation system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes an image editing system 104 that further includes the transformer-based image segmentation system 102. In one or more embodiments, the transformer-based image segmentation system 102 segments a digital visual media item into a plurality of semantic regions. In some embodiments, the server device(s) 106 includes, but is not limited to, a computing device (such as explained below in reference to FIG. 11).

In some instances, the transformer-based image segmentation system 102 receives a request from the client device 108 to segment a digital visual media item. For example, the request includes an instruction to analyze a digital image portraying a subject, and to divide the digital image into a plurality of regions (e.g., groups of pixels) that differentiate different portions of the image as being representative of different classifications.

In some embodiments, a digital visual media item includes any digital item capable of producing a visual representation. In particular, in one or more embodiments, a digital visual media item includes a previously captured digital item, such as a previously captured digital image (e.g., a digital photo, portrait, or other digitally created image) or a previously captured digital video. In some embodiments, a digital visual media item includes a digital camera feed or other digital video feed. Further, in some instances, a digital visual media item includes a video frame of a previously captured digital video or a video frame of a digital video feed. A portrait includes a digital photograph of a foreground subject, such as a person or a group of people.

In some embodiments, a digital visual media item depicts one or more objects. In some cases, an object includes a distinguishable element depicted in the digital visual media item. For example, in one or more embodiments, an object includes a person, an item, a natural object (e.g., a tree or a rock formation) or a structure depicted in the digital visual media item. In some instances, an object includes a plurality of elements that, collectively, are distinguished from other elements depicted in the digital visual media item. For example, in some instances, an object includes a collection of buildings that make up a skyline. In some instances, an object more broadly includes a foreground or other element(s) depicted in the digital visual media item as distinguished from a background.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below in reference to FIG. 11. Some embodiments of client device 108 are operated by a user to perform a variety of functions via an image editing application 110 on client device 108. For example, the client device 108 (through the image editing application 110) performs functions such as, but not limited to, capturing one or more digital visual media items, receiving one or more digital visual media items, selecting types of and/or quantity of classes for segmenting the one or more digital visual media items, segmenting the one or more digital visual media items, and/or comparing segmentations of one or more digital visual media items to a ground truth of segmentations.

To access the functionalities of the transformer-based image segmentation system 102 (as described above and in greater detail below), in one or more embodiments, a user interacts with the image editing application 110 on the client device 108. For example, the image editing application 110 includes one or more software applications (e.g., to interact with and/or modify digital visual media items in accordance with one or more embodiments described herein) installed on the client device 108, such as a transformer-based image segmentation application. In certain instances, the image editing application 110 is hosted on the server device(s) 106. Additionally, when hosted on the server device(s) 106, the image editing application 110 is accessed by the client device 108 through a web browser and/or another online interfacing platform and/or tool.

As illustrated in FIG. 1, in some embodiments, the transformer-based image segmentation system 102 is hosted by the image editing application 110 on the client device 108 (e.g., additionally, or alternatively to being hosted by the image editing system 104 on the server device(s) 106). For example, the transformer-based image segmentation system 102 performs the image segmentation techniques described herein on the client device 108.

Further, although FIG. 1 illustrates the transformer-based image segmentation system 102 being implemented by a particular component and/or device within the system 100 (e.g., the server device(s) 106 and/or the client device 108), in some embodiments the transformer-based image segmentation system 102 is implemented, in whole or in part, by other computing devices and/or components in the system 100. For instance, in some embodiments, the transformer-based image segmentation system 102 is implemented on another client device. More specifically, in one or more embodiments, the description of (and acts performed by) the transformer-based image segmentation system 102 are implemented by (or performed by) the image editing application 110 on another client device.

In some embodiments, the image editing application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., files of digital images, selection of segmentation classes). In response, the transformer-based image segmentation system 102 on the server device(s) 106 performs operations described herein to segment a digital visual media item. The server device(s) 106 provides the output or results of the operations (e.g., the segmented digital visual media item) to the client device 108. As another example, in some implementations, the transformer-based image segmentation system 102 on the client device 108 performs operations described herein to segment a digital visual media item. The client device 108 provides the output or results of the operations (e.g., the segmented digital visual media item) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 11. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

Figure 2:
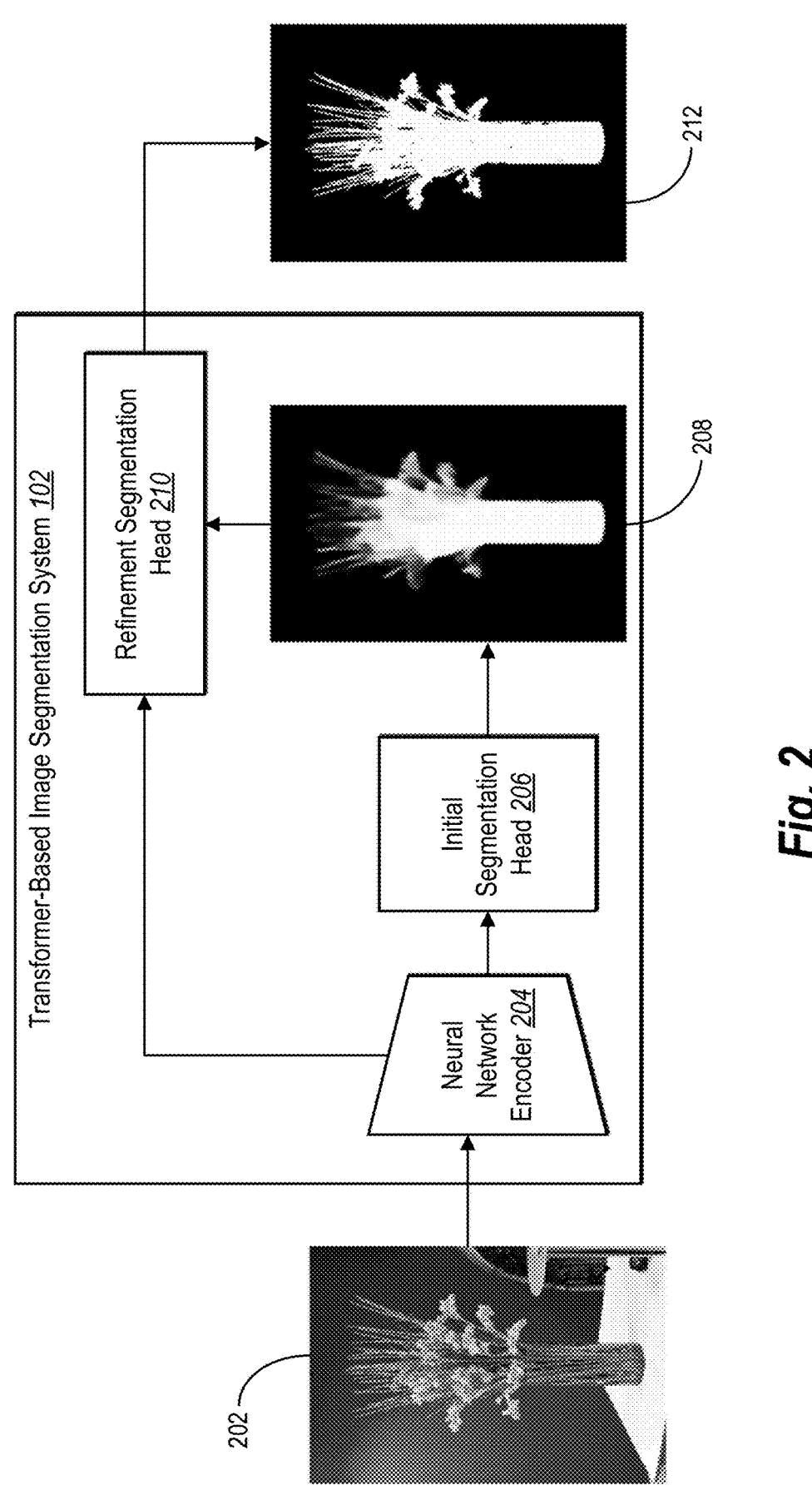
FIG. 2 illustrates an overview of the transformer-based image segmentation system generating an initial segmentation mask and generating a refined segmentation mask in accordance with one or more embodiments.

As discussed above, the transformer-based image segmentation system 102 segments digital visual media items. For instance, FIG. 2 illustrates the transformer-based image segmentation system 102 generating an initial segmentation mask for a digital visual media item, and further generating a refined segmentation mask for the digital visual media item, in accordance with one or more embodiments.

In some embodiments, a segmentation mask generally includes an identification of pixels in a digital visual media item that represent an object. In particular, in one or more embodiments, a segmentation mask includes a filter useful for partitioning a digital visual media item into separate portions. For example, in some cases, a segmentation mask includes a filter that corresponds to a digital visual media item and identifies a portion of the digital visual media item (e.g., pixels of the digital visual media item) belonging to one or more objects and a portion of the digital visual media item belonging to a background. For example, in some embodiments, a segmentation mask includes a map of a digital visual media item that has an indication for each pixel of whether the pixel corresponds to part of an object or not. In some implementations, the indication includes a binary indication (e.g., a 1 for pixels belonging to the object and a 0 for pixels not belonging to the object). In alternative implementations, the indication includes a probability (e.g., a number between 0 and 1) that indicates the likelihood that a pixel belongs to an object. In such implementations, the closer the value is to 1, the more likely the pixel belongs to an object, and vice versa. In one or more embodiments, a segmentation mask has a resolution that differs from the resolution of the corresponding digital visual media item.

In some embodiments, a resolution includes a number of pixels. In particular, in one or more embodiments, a resolution includes the number of pixels depicted in a digital visual media item or a corresponding segmentation mask. To illustrate, in one or more embodiments, a relatively higher resolution corresponds to a relatively greater degree of detail reflected in the digital visual media item or segmentation mask, especially with regard to fine or complex details (e.g., hair, fur, textures, etc.). In some implementations, a high resolution includes a resolution at 2K (e.g., 2560×1440 pixels) or above. Accordingly, in some cases, a low resolution includes a resolution below 2K. It should be understood, however, that in many instances, the terms "low" and "high" are relative so that a high resolution includes a resolution having a greater number of pixels than another resolution and, similarly, a low resolution includes a resolution having a lower number of pixels than another resolution.

Relatedly, in some embodiments, an initial segmentation mask includes a segmentation mask generated initially from the corresponding digital visual media item. For example, in one or more embodiments, an initial segmentation mask includes a first segmentation mask generated by a segmentation refinement neural network based on the corresponding digital visual media item. In some cases, an initial segmentation mask includes a first segmentation mask generated by a segmentation refinement neural network based on low-level features of the corresponding digital visual media item.

Additionally, in some embodiments, a refined segmentation mask includes a segmentation mask generated based on another segmentation mask, such as an initial segmentation mask or a preceding refined segmentation mask. In particular, in one or more implementations, a refined segmentation mask includes a segmentation mask having pixels that have been re-analyzed or re-classified to indicate whether or not those pixels belong to an object portrayed in the digital visual media item. For example, in some implementations, a refined segmentation mask includes a segmentation mask having one or more pixels that were indicated, in a previous segmentation mask, as being uncertain as to whether or not they belong to an object but have since been determined to belong or not belong to an object with a greater certainty. In some cases, a refined segmentation mask includes a second segmentation mask generated by a segmentation refinement neural network based on high-level features and an initial segmentation mask of the corresponding digital visual media item.

Specifically, FIG. 2 shows the transformer-based image segmentation system 102 obtaining a digital visual media item 202. In some embodiments, the transformer-based image segmentation system 102 captures the digital visual media item 202 (e.g., utilizing a camera of the client device 108). In some embodiments, the transformer-based image segmentation system 102 receives the digital visual media item 202 (e.g., from another system). In some embodiments, the transformer-based image segmentation system 102 recalls the digital visual media item 202 (e.g., from a memory storage medium of the client device 108).

As illustrated in FIG. 2, the transformer-based image segmentation system 102 processes the digital visual media item 202 utilizing a neural network encoder 204. The transformer-based image segmentation system 102 utilizes the neural network encoder 204 to generate high-level features of the digital visual media item 202, and to generate low-level features of the digital visual media item 202. For example, and as described in more detail below, the transformer-based image segmentation system 102 passes the digital visual media item 202 through layers of the segmentation refinement neural network, successively reducing the resolution as it extracts the features of from the digital visual media item 202.

In some embodiments, a segmentation refinement neural network includes an artificial neural network that generates refined segmentation masks for digital visual media items. More particularly, in one or more embodiments, a segmentation refinement neural network includes a neural network that analyzes a digital visual media item, generates an initial segmentation mask for the digital visual media item, and generates one or more refined segmentation masks based on the initial segmentation mask. For example, in one or more embodiments, a segmentation refinement neural network includes a neural network composed of an encoder-decoder network architecture.

A neural network encoder (or encoder) includes an artificial neural network or a portion of an artificial neural network that encodes a digital visual media item to generate features (e.g., a feature map) of the digital visual media item. To illustrate, in some embodiments, a neural network encoder includes convolution layers and a transformer block to generate features of a digital visual media item at various levels of resolution.

A neural network decoder (or decoder) includes an artificial neural network or a portion of an artificial neural network that decodes features (e.g., a feature map) of a digital visual media item to generate one or more segmentation masks of the digital visual media item. For example, a neural network decoder includes one or more segmentation heads that generate segmentation masks for the digital visual media item. For instance, in some embodiments, a neural network decoder includes a first segmentation head (e.g., an initial segmentation head) to generate an initial segmentation mask, and a second segmentation head (e.g., a refinement segmentation head) to generate a refined segmentation mask. Decoding includes utilizing a neural network decoder to analyze features of a digital visual media item to generate a segmentation mask.

A segmentation head includes an artificial neural network or a portion of an artificial neural network that analyzes features of a digital visual media item to generate a segmentation mask for the digital visual media item. To illustrate, a transformer-based image segmentation system passes the features of the digital visual media item through layers of a segmentation head to determine probability values that the several pixels of a feature map represent a particular semantic classification. Further, a segmentation head includes a feature refinement head for refining particular features of a segmentation mask to generate a feature refinement segmentation mask.

The transformer-based image segmentation system 102 processes the low-level features of the digital visual media item 202 utilizing an initial segmentation head 206. Utilizing the initial segmentation head 206, the transformer-based image segmentation system 102 generates an initial segmentation mask 208 of the digital visual media item 202.

The transformer-based image segmentation system 102 processes the high-level features of the digital visual media item 202 utilizing a refinement segmentation head 210. Additionally, the transformer-based image segmentation system 102 inputs the initial segmentation mask 208 into the refinement segmentation head 210. In some embodiments, the transformer-based image segmentation system 102 does not input the low-level features of the digital visual media item 202 into the refinement segmentation head 210. Utilizing the refinement segmentation head 210, the transformer-based image segmentation system 102 generates a refined segmentation mask 212 of the digital visual media item 202.

In one or more embodiments, a feature map generally includes a set of numerical values representing features utilized by a neural network, such as a segmentation refinement neural network. To illustrate, in some instances, a feature map includes a set of values corresponding to latent and/or patent attributes and characteristics of an input analyzed by a neural network (e.g., a digital visual media item). In one or more embodiments, an encoded feature map includes a feature map generated by an encoder of a neural network. For example, in some cases, an encoded feature map includes a set of encoded values corresponding to latent and/or patent attributes and characteristics of an input analyzed by the neural network or, more specifically, the encoder. In contrast, in one or more embodiments, a decoded feature map includes a feature map generated by a decoder of a neural network. For example, in some cases, a decoded feature map includes a set of decoded values corresponding to latent and/or patent attributes and characteristics of an input analyzed by the neural network or, more specifically, the decoder.

Relatedly, in some embodiments, high-level features of a digital visual media item include numerical values representing features at a high resolution (e.g., one half of the resolution of the original digital visual media item). Similarly, in some embodiments, low-level features of a digital visual media item include numerical values representing features at a low resolution (e.g., one thirty-second of the resolution of the original digital visual media item). A lower-level set of features is a set of features at a lower resolution than another set of features. Similarly, a higher-level set of features is a set of features at a higher resolution than another set of features. A dimension of a set of features includes a measure of the resolution of the set of features.

As noted, in some implementations, the transformer-based image segmentation system 102 splits the features of the digital visual media item 202 into high-level features and low-level features (e.g., the transformer-based image segmentation system 102 keeps the high-level features separate or distinct from the low-level features). Also, the transformer-based image segmentation system 102 inputs the low-level features (e.g., without the high-level features) into the initial segmentation head 206, and inputs the high-level features (e.g., with the initial segmentation mask 208, but without the low-level features) into the refinement segmentation head 210. By splitting the features of the digital visual media item 202 in this way (e.g., by partitioning the low-level features and the high-level features), in some embodiments, the transformer-based image segmentation system 102 offers increased efficiency and accuracy over conventional systems. For instance, the transformer-based image segmentation system 102 decreases memory usage by not requiring computations on a large tensor, instead separating operations respectively for low-resolution features and high-resolution features, and thereby reducing the overall size (and therefore memory usage) of the required data. Furthermore, in some embodiments, the transformer-based image segmentation system 102 increases accuracy by focusing the initial segmentation head 206 and the refinement segmentation head 210 on their respective strengths. For example, by utilizing the initial segmentation head 206 to generate the initial segmentation mask 208, the transformer-based image segmentation system 102 accurately captures details of large portions (e.g., large objects or background) of the digital visual media item 202. Further, by utilizing the refinement segmentation head 210 to generate the refined segmentation mask 212, the transformer-based image segmentation system 102 accurately captures details of small portions (e.g., small objects) of the digital visual media item 202. In this way, some implementations of the transformer-based image segmentation system 102 yield highly accurate segmentation masks while limiting the computational resources necessary to obtain such segmentation masks, thereby rendering the transformer-based image segmentation system 102 suitable for applications requiring reduced memory usage (e.g., use on mobile devices).

In some implementations, the transformer-based image segmentation system 102 inputs the refined segmentation mask 212, as well as the high-level features of the digital visual media item 202, into an additional segmentation head (e.g., a feature refinement head) to generate a feature refinement segmentation mask of the digital visual media item 202. For instance, in some embodiments, the transformer-based image segmentation system 102 refines details of the segmentation masks beyond the refinement provided utilizing the refinement segmentation head 210. To illustrate, and as discussed with additional specificity below, the transformer-based image segmentation system 102 further refines a portion of the refined segmentation mask 212 representing teeth (or eyes, or any other feature depicted in the digital visual media item 202).

Figure 3:
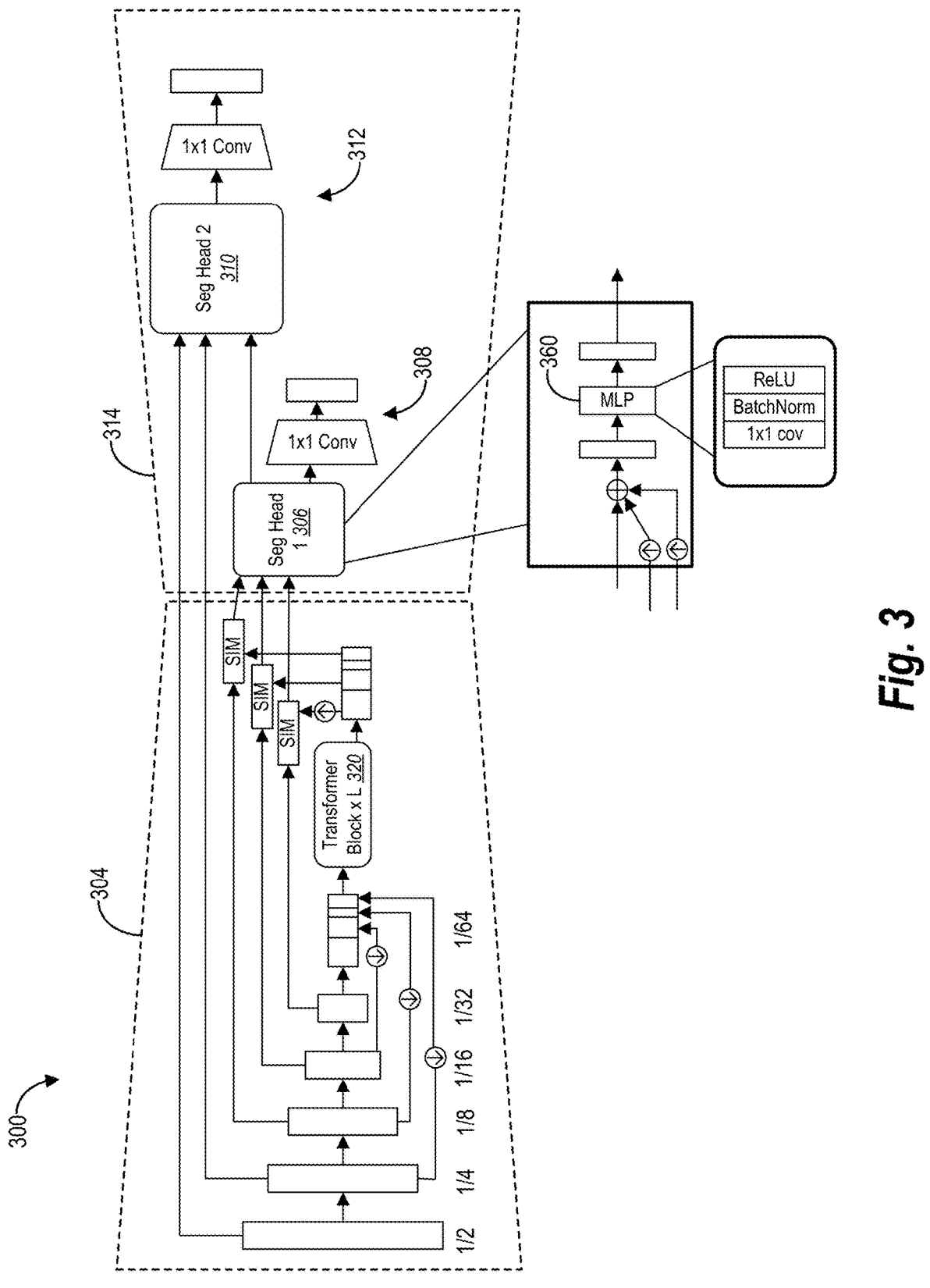
FIG. 3 illustrates a schematic diagram of an example architecture of a segmentation refinement neural network of the transformer-based image segmentation system in accordance with one or more embodiments.

As discussed above, the transformer-based image segmentation system 102 utilizes a segmentation refinement neural network to generate segmentation masks. For instance, FIG. 3 illustrates an example architecture of a segmentation refinement neural network 300 in accordance with one or more embodiments. Specifically, FIG. 3 shows the segmentation refinement neural network 300 having an encoder 304 and a decoder 314, wherein the decoder 314 has a first segmentation head 306 (e.g., the initial segmentation head 206) and a second segmentation head 310 (e.g., the refinement segmentation head 210). As described in additional detail below, the transformer-based image segmentation system 102 utilizes the encoder 304 to generate features of a digital visual media item. Additionally, the transformer-based image segmentation system 102 utilizes the decoder 314 to generate segmentation masks of the digital visual media item. More specifically, the transformer-based image segmentation system 102 utilizes the first segmentation head 306 to generate an initial segmentation mask 308 for the digital visual media item. Further, the transformer-based image segmentation system 102 utilizes the second segmentation head 310 to generate a refined segmentation mask 312 for the digital visual media item.

As illustrated in FIG. 3, in some embodiments, the segmentation refinement neural network 300 comprises the encoder 304. The transformer-based image segmentation system 102 utilizes the encoder 304 to generate features (e.g., feature maps) of a digital visual media item. To illustrate, the transformer-based image segmentation system 102 passes the digital visual media item through convolutional layers of the encoder 304 to generate the features. For example, the transformer-based image segmentation system 102 generates features at half-resolution of the digital visual media item, at quarter-resolution of the digital visual media item, at eighth-resolution of the digital visual media item, at sixteenth-resolution of the digital visual media item, at thirty-second-resolution of the digital visual media item, and at sixty-fourth-resolution of the digital visual media item.

In some embodiments, the transformer-based image segmentation system 102 generates the initial segmentation mask 308 based on low-level features of the digital visual media item. For example, the transformer-based image segmentation system 102 inputs low-level features (e.g., the sixty-fourth-resolution, the thirty-second-resolution, the sixteenth-resolution, and the eighth-resolution features) of the digital visual media item into the first segmentation head 306. In some cases, the transformer-based image segmentation system 102 does not input high-level features (e.g., the half-resolution features) of the digital visual media item into the first segmentation head 306.

As illustrated in FIG. 3, in some implementations, the transformer-based image segmentation system 102 down-samples a portion of the low-level features to match a dimension of a lower-level set of the low-level features of the digital visual media item. For example, the transformer-based image segmentation system 102 down-samples the fourth-resolution features, the eighth-resolution features, and the sixteenth-resolution features, to match the dimension of the sixty-fourth-resolution features.

Down-sampling includes resampling a digital visual media item to reduce a resolution of the digital visual media item. For example, down-sampling includes compression of the digital visual media item to a lower resolution. Up-sampling includes resampling a digital visual media item to increase a resolution of the digital visual media item. For instance, up-sampling includes expansion and/or interpolation of the digital visual media item to a higher resolution.

In some embodiments, the transformer-based image segmentation system 102 inputs some or all of the low-level features into a transformer block 320. In some embodiments, a transformer block includes an artificial neural network or a portion of an artificial neural network that utilizes self-attention to differentially weight various parts of input data while handling long-range dependencies in a sequential task. To illustrate, a transformer block preserves intermediate contextual features for further analysis by another portion of the artificial neural network, or by another artificial neural network. A transformed set of features includes a set of features that has been revised (e.g., weighted) by a transformer block.

The transformer-based image segmentation system 102 generates a transformed set of features by passing the low-level features (e.g., the down-sampled portion of the low-level features) through the transformer block. In some cases, the transformer block 320 is a mobile-friendly transformer-based model (e.g., Topformer) suitable for use on a mobile device. For example, in some embodiments, by utilizing the transformer block 320, the transformer-based image segmentation system 102 minimizes model size and/or memory usage for encoding features of the digital visual media item. In this way, the transformer-based image segmentation system 102 is well suited for use on the client device 108 (e.g., a mobile device).

In some implementations, the transformer-based image segmentation system 102 generates the initial segmentation mask 308 of the digital visual media item from the low-level features by decoding the low-level features, without the high-level features. For example, as shown in FIG. 3, the transformer-based image segmentation system 102 inputs the low-level features (e.g., after down-sampling and transforming some of the low-level features) into the first segmentation head 306. The transformer-based image segmentation system 102 does not input the high-level features (e.g., the half-resolution features) into the first segmentation head 306. In some embodiments, by omitting the high-resolution features from the inputs to the first segmentation head 306, the transformer-based image segmentation system 102 reduces required computational resources (e.g., memory, processing time) to generate the initial segmentation mask 308.

As illustrated in FIG. 3, in some embodiments, the transformer-based image segmentation system 102 utilizes the first segmentation head 306 to generate the initial segmentation mask 308 by up-sampling a portion of the low-level features to match a dimension of a higher-level set of the low-level features. For example, the transformer-based image segmentation system 102 up-samples the thirty-second-resolution features and the sixteenth-resolution features to match the dimension of the eighth-resolution features.

As further illustrated in FIG. 3, the transformer-based image segmentation system 102 combines the up-sampled portion of the low-level features with the higher-level set of the low-level features. For example, the transformer-based image segmentation system 102 utilizes a series sum operation to combine features of the digital visual media item. As another example, the transformer-based image segmentation system 102 utilizes a concatenation operation to combine features of the digital visual media item.

As depicted in FIG. 3, the transformer-based image segmentation system 102 utilizes a multilayer perceptron 360 to generate the initial segmentation mask 308. For example, the transformer-based image segmentation system 102 passes the combined low-level features through layers of the multilayer perceptron 360, such as a convolutional layer, a batch normalization layer, and a rectified linear unit.

To generate the refined segmentation mask 312 of the digital visual media item, the transformer-based image segmentation system 102 utilizes the second segmentation head 310 with the high-level features and the initial segmentation mask 308. For instance, the transformer-based image segmentation system 102 generates the refined segmentation mask 312 by decoding the high-level features and the initial segmentation mask 308. For example, as shown in FIG. 3, the transformer-based image segmentation system 102 inputs the high-level features (e.g., the half-resolution features and the quarter-resolution features) into the second segmentation head 310. In some implementations, the transformer-based image segmentation system 102 omits the low-level features (e.g., the sixty-fourth-resolution, the thirty-second-resolution, the sixteenth-resolution, and the eighth-resolution features) from the inputs to the second segmentation head 310. However, in some embodiments, the transformer-based image segmentation system 102 includes the initial segmentation mask 308 as an input to the second segmentation head 310. In some cases, the second segmentation head 310 has an architecture the same as or similar to the architecture of the first segmentation head 306. For instance, the second segmentation head 310 comprises a combination operation (e.g., concatenation, series sum) and a multilayer perceptron.

A concatenation operation includes combining a set of features (e.g., a feature map) with another set of features (e.g., another feature map) to generate an augmented set of features. For example, a concatenation of a first feature map with a second feature map includes generating a third feature map with a dimension large enough to include both the first feature map and the second feature map together.

A series sum operation (or series sum) includes adding values of features for corresponding pixels of multiple sets of features (e.g., feature maps at differing levels of resolution). To illustrate, a series sum of an eighth-resolution set of features with an up-sampled sixteenth-resolution set of features includes pixel-wise summing of numerical values in the two sets of features to generate a summed set of features.

Figure 4:
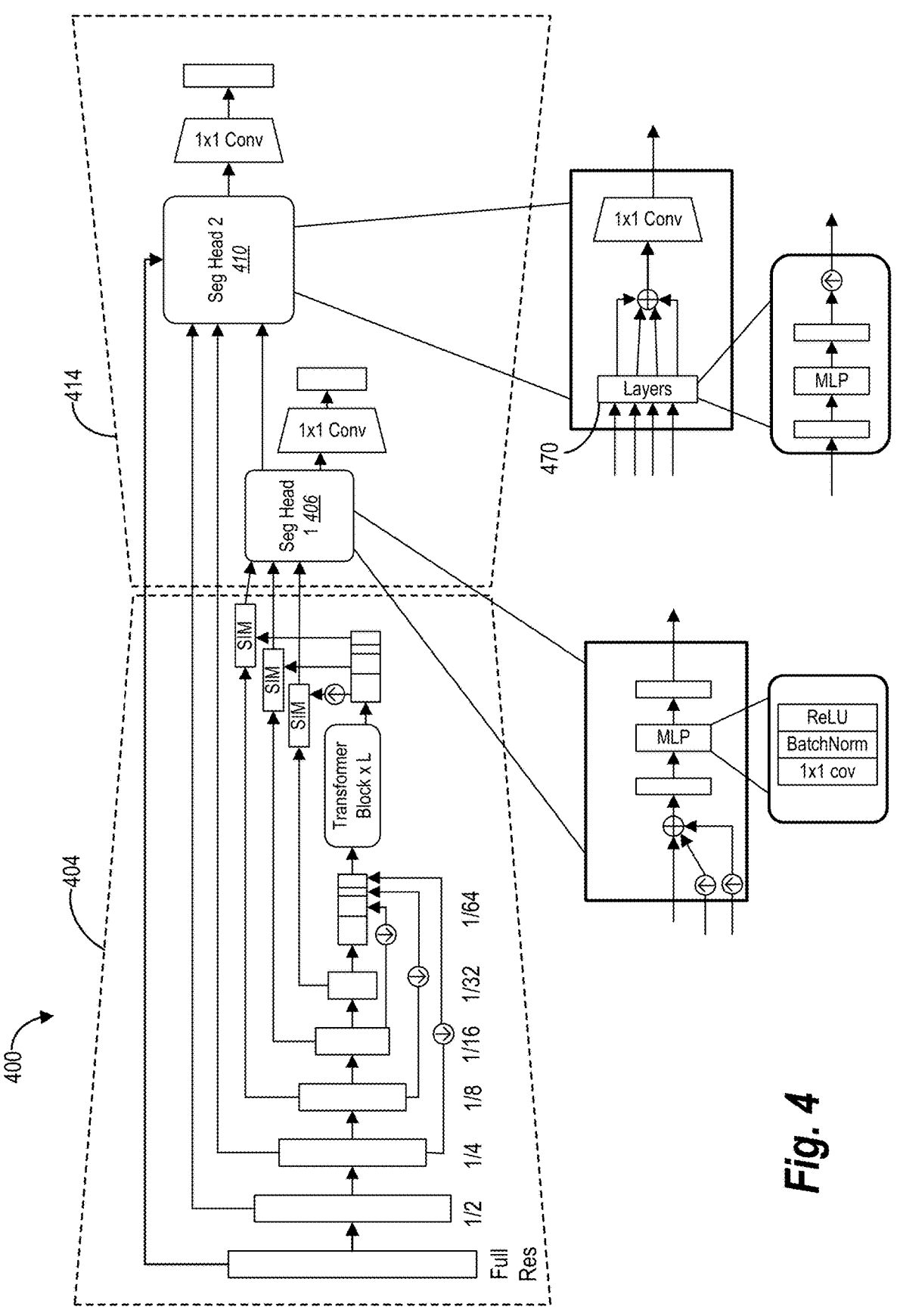
FIG. 4 illustrates a schematic diagram of another example architecture of a segmentation refinement neural network of the transformer-based image segmentation system in accordance with one or more embodiments.

As discussed above, the transformer-based image segmentation system 102 utilizes one of a variety of different architectures of a segmentation refinement neural network to generate segmentation masks. For instance, FIG. 4 illustrates an example architecture of a segmentation refinement neural network 400 in accordance with one or more embodiments. Specifically, FIG. 4 shows the segmentation refinement neural network 400 with an encoder 404 and a decoder 414, wherein the decoder 414 has a first segmentation head 406 (e.g., the initial segmentation head 206) and a second segmentation head 410 (e.g., the refinement segmentation head 210). Similar to the description above for the encoder 304, the transformer-based image segmentation system 102 utilizes the encoder 404 to generate features of a digital visual media item. Additionally, the transformer-based image segmentation system 102 utilizes the decoder 414 to generate segmentation masks of the digital visual media item. More specifically, the transformer-based image segmentation system 102 utilizes the first segmentation head 406 to generate an initial segmentation mask for the digital visual media item. Further, the transformer-based image segmentation system 102 utilizes the second segmentation head 410 to generate a refined segmentation mask for the digital visual media item.

In some respects, the architecture of the segmentation refinement neural network 400 is similar to the architecture of the segmentation refinement neural network 300 illustrated in FIG. 3. As explained further below, the segmentation refinement neural network 400 differs from the segmentation refinement neural network 300 in at least two respects: the use of full-resolution features and the architecture of the second segmentation head.

As depicted in FIG. 4, the transformer-based image segmentation system 102 utilizes full-resolution features of the digital visual media item to encode lower-level features and to generate the refined segmentation mask. For instance, the transformer-based image segmentation system 102 utilizes the full-resolution features (e.g., the original digital visual media item) in the encoder 404. For example, the high-level features include the full-resolution features. Additionally, the transformer-based image segmentation system 102 inputs the full-resolution features into the second segmentation head 410 to generate the refined segmentation mask.

FIG. 4 illustrates the segmentation refinement neural network 400 with detail of the second segmentation head 410. As mentioned above, in some embodiments, the second segmentation head has a same or similar architecture as the first segmentation head (e.g., the first segmentation head 306 and the second segmentation head 310 have the same architecture). By contrast, in some embodiments, the second segmentation head has a different architecture from the first segmentation head. To illustrate, the second segmentation head 410 has a different architecture from the first segmentation head 406. In particular, the transformer-based image segmentation system 102 decodes the high-level features and the initial segmentation mask by inputting the high-level features and the initial segmentation mask to the second segmentation head 410. The transformer-based image segmentation system 102 runs the high-level features and the initial segmentation mask through layers 470 of the second segmentation head 410, such as convolutional layers and a multilayer perceptron, before combining these inputs. Upon passing the high-level features and the initial segmentation mask through the layers 470, the transformer-based image segmentation system 102 up-samples the high-level features and the initial segmentation mask and combines them. More particularly, the transformer-based image segmentation system 102 generates refined high-level features from the initial segmentation mask and the high-level features utilizing a multilayer perceptron. The transformer-based image segmentation system 102 up-samples the refined high-level features and then combines the up-sampled refined high-level features together. In some implementations, the transformer-based image segmentation system 102 combines the up-sampled refined high-level features by utilizing a concatenation operation. In some embodiments, the transformer-based image segmentation system 102 combines the up-sampled refined high-level features by utilizing a series sum operation.

In some embodiments, the transformer-based image segmentation system 102 offers increased efficiency by utilizing the series sum operation to combine the features of the digital visual media item. For example, the transformer-based image segmentation system 102 utilizes a reduced embedding dimension and the series sum operation, thereby reducing required memory usage to generate the segmentation masks without sacrificing accuracy of the segmentation masks.

Figure 5:
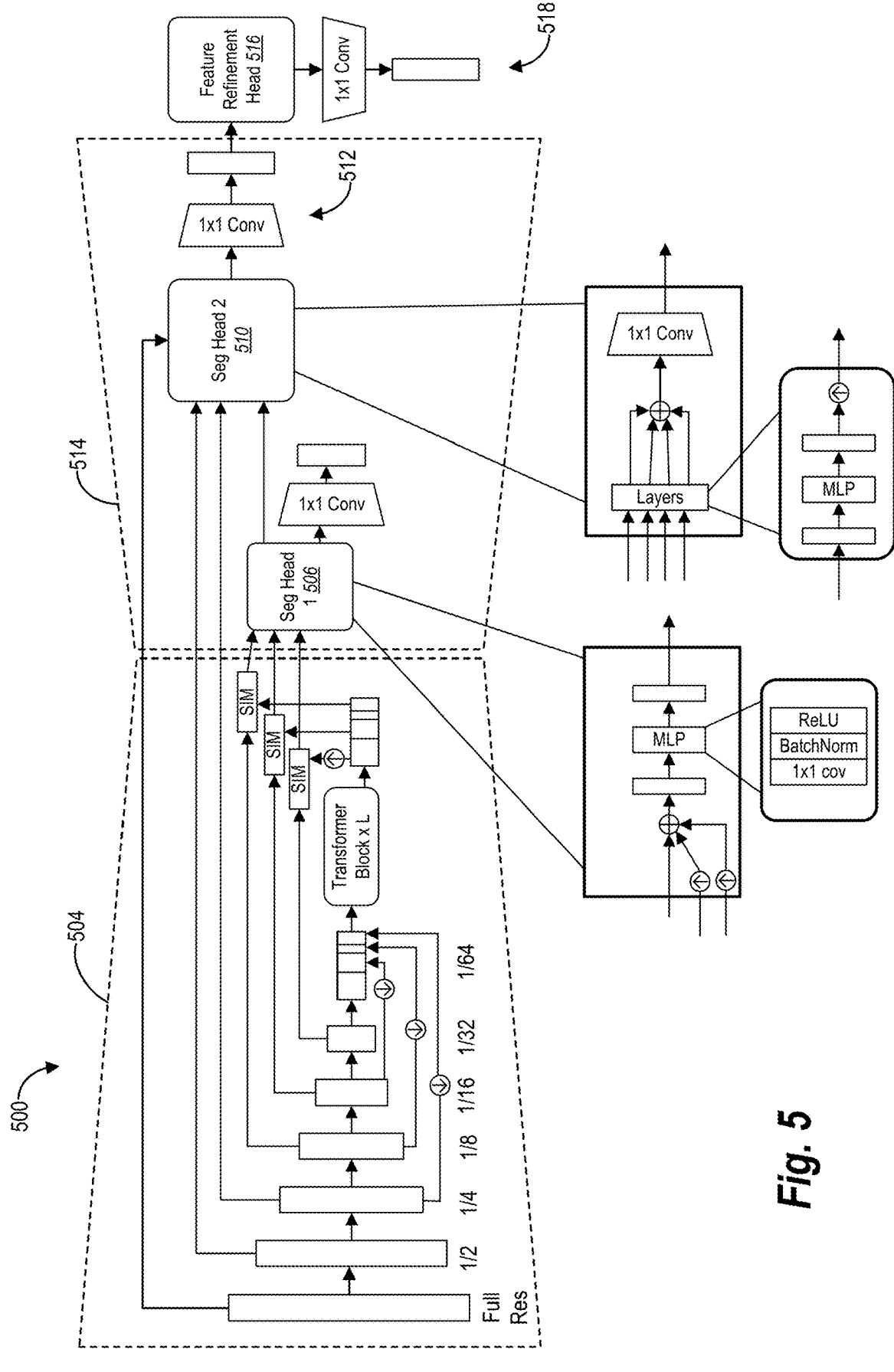
FIG. 5 illustrates a schematic diagram of another example architecture of a segmentation refinement neural network of the transformer-based image segmentation system in accordance with one or more embodiments.

FIG. 5 illustrates an example architecture of a segmentation refinement neural network 500 in accordance with one or more embodiments. Specifically, FIG. 5 shows the segmentation refinement neural network 500 with an encoder 504 and a decoder 514, wherein the decoder 514 has a first segmentation head 506 (e.g., the initial segmentation head 206) and a second segmentation head 510 (e.g., the refinement segmentation head 210). Additionally, the segmentation refinement neural network 500 has a third segmentation head 516 (e.g., a feature refinement head 516). Similar to the description above for the encoders 304 and 404, the transformer-based image segmentation system 102 utilizes the encoder 504 to generate features of a digital visual media item. Additionally, the transformer-based image segmentation system 102 utilizes the decoder 514 to generate segmentation masks of the digital visual media item. More specifically, the transformer-based image segmentation system 102 utilizes the first segmentation head 506 to generate an initial segmentation mask for the digital visual media item. Further, the transformer-based image segmentation system 102 utilizes the second segmentation head 510 to generate a refined segmentation mask for the digital visual media item. As depicted in FIG. 5, in some embodiments, the first segmentation head 506 has a same or similar architecture as the architectures of the first segmentation heads 306 and 406. Furthermore, in some embodiments, the second segmentation head 510 has a same or similar architecture as the architecture of the second segmentation head 410. Alternatively, in some embodiments, the second segmentation head 510 has a same or similar architecture as the architecture of the second segmentation head 310 (e.g., the same architecture as the first segmentation head 306).

Further, the transformer-based image segmentation system 102 utilizes the feature refinement head 516 to generate a feature refinement segmentation mask of the digital visual media item. To illustrate, in some embodiments, the transformer-based image segmentation system 102 utilizes the feature refinement head 516 to identify particular features in the digital visual media item and generate a feature refinement segmentation mask with additional attention given to the particular features. For example, in some cases, the transformer-based image segmentation system 102 identifies teeth (and/or other features such as eyes, lips, hair, beard, etc.) within the digital visual media item. To illustrate, the transformer-based image segmentation system 102 utilizes the second segmentation head 510 to generate a refined segmentation mask 512, and inputs the refined segmentation mask 512 into the feature refinement head 516. In some implementations, the transformer-based image segmentation system 102 also inputs the high-level features and the initial segmentation mask into the feature refinement head 516 (e.g., the inputs to the second segmentation head 510 are also inputs to the feature refinement head 516). The transformer-based image segmentation system 102 utilizes the feature refinement head 516 to analyze the refined segmentation mask 512 and further refine one or more features of the refined segmentation mask 512, thereby generating a feature refinement segmentation mask 518.

In some implementations, the feature refinement head 516 has an architecture the same as or similar to the architecture of the second segmentation head 510. For example, as illustrated in FIG. 5, the transformer-based image segmentation system 102 decodes the refined segmentation mask 512 (and, in some cases, the high-level features and the initial segmentation mask) by inputting the refined segmentation mask 512 to the feature refinement head 516. The transformer-based image segmentation system 102 runs the refined segmentation mask 512, the high-level features, and the initial segmentation mask through layers of the feature refinement head 516, such as convolutional layers and a multilayer perceptron. Upon passing the refined segmentation mask 512, the high-level features, and the initial segmentation mask through the layers, the transformer-based image segmentation system 102 up-samples a portion of the high-level features and combines them. In some implementations, the transformer-based image segmentation system 102 combines the up-sampled portion of the high-level features by utilizing a concatenation operation. In some embodiments, the transformer-based image segmentation system 102 combines the up-sampled portion of the high-level features by utilizing a series sum operation.

As noted, in some embodiments, the feature refinement head 516 has an architecture the same as or similar to the architecture of the second segmentation head 510. Thus, for embodiments in which the second segmentation head 510 has a same or similar architecture as the architecture of the first segmentation head 506, the feature refinement head 516 likewise has an architecture the same as or similar to the first segmentation head 506 (e.g., the same as the architecture of the first segmentation head 306 described above).

Figure 6:
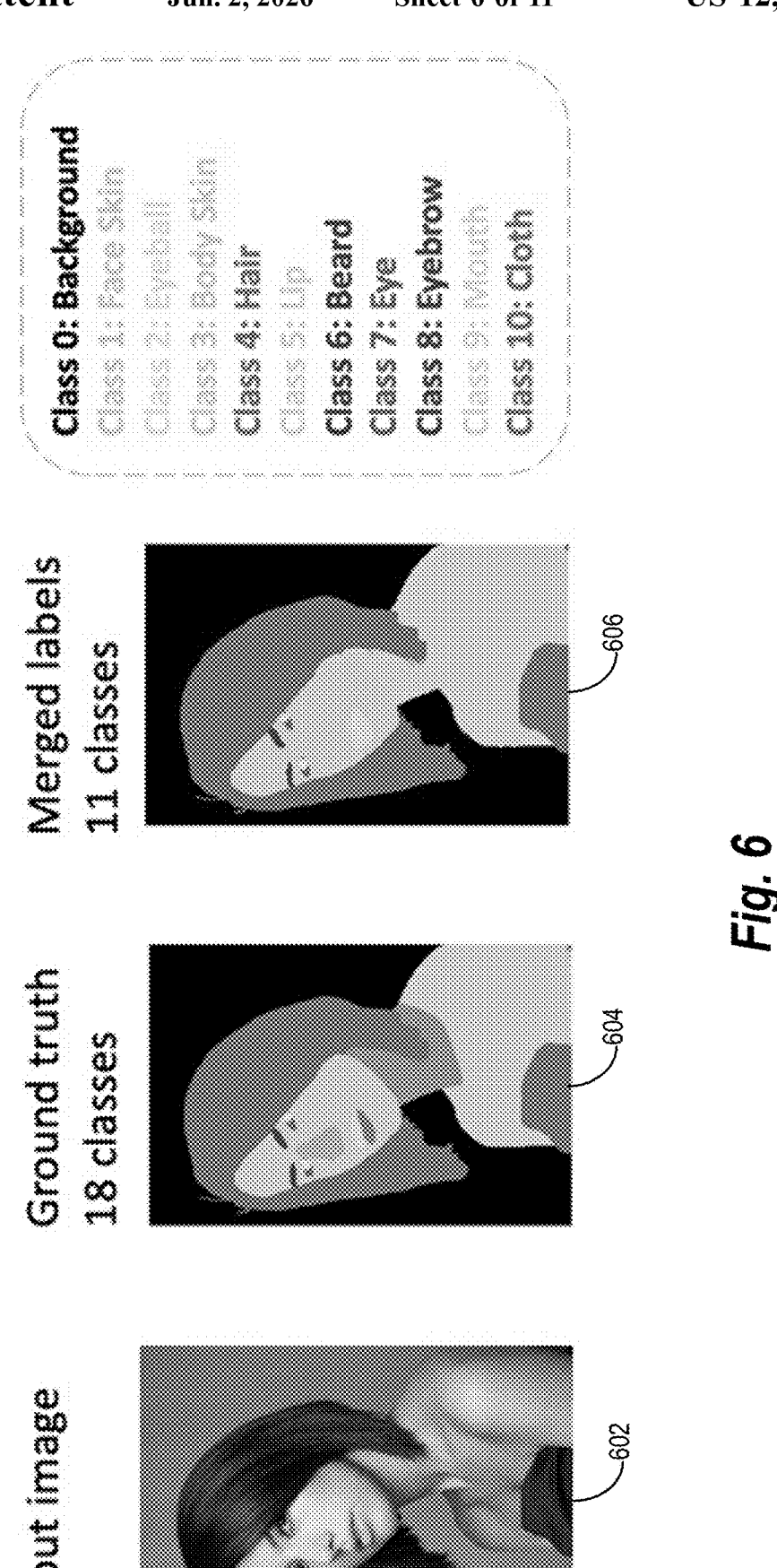
FIG. 6 illustrates an example digital visual media item, a corresponding ground truth segmentation mask for the digital visual media item, and a segmentation mask with merged classes in accordance with one or more embodiments.

As discussed above, in one or more implementations, the transformer-based image segmentation system 102 is trained to generate segmentation masks comprising a plurality of semantic regions. For instance, FIG. 6 illustrates ground truth segmentation masks for the transformer-based image segmentation system 102 in accordance with one or more embodiments. Specifically, FIG. 6 shows a digital visual media item 602 comprising a portrait of a person, a ground truth segmentation mask 604 for the digital visual media item 602 comprising 18 classes, and a merged ground truth segmentation mask 606 for the digital visual media item 602 comprising 11 classes.

To illustrate, in some embodiments, the transformer-based image segmentation system 102 analyzes portraits to associate portions of the portrait with one (or more) of a plurality of semantic classifications. For example, the transformer-based image segmentation system 102 detects and classifies numerous possible objects within a portrait, such as (but not limited to) hair, eye, eyeball, iris, eyebrow, mouth, upper lip, lower lip, teeth, beard, facial skin, neck skin, body skin, nose, ear, clothing, glasses, hat, accessories, and/or background. In some cases, the transformer-based image segmentation system 102 classifies a pixel as uncertain (e.g., requiring further analysis). In some embodiments, the transformer-based image segmentation system 102 assigns a probability value to each pixel, the probability value representing a likelihood that the pixel belongs to a particular class.

In some embodiments, the transformer-based image segmentation system 102 trains the segmentation refinement neural network using a dataset of digital visual media items that includes a wide range of portrait types. For instance, the dataset includes portraits depicting people of various ages, genders, and skin colors, as well as portraits with a single person and portraits with multiple people. Furthermore, the dataset includes both simple digital images (e.g., portraits of a person in a typical pose) and complex digital images (e.g., complex portraits with shadow on a person's face, tattoos on body skin, and/or unusual body poses).

In some implementations, the transformer-based image segmentation system 102 merges multiple classes into a single class. For example, in some cases, there is no need to differentiate neck skin and body skin, and the transformer-based image segmentation system 102 merges these classes. As another example, the transformer-based image segmentation system 102 merges upper lip, lower lip, and mouth into a single class. To illustrate, FIG. 6 depicts the ground truth segmentation mask 604 and the merged ground truth segmentation mask 606. The ground truth segmentation mask 604 comprises 18 classes, while the merged ground truth segmentation mask 606 comprises 11 classes. In this example, the transformer-based image segmentation system 102 trains the segmentation refinement neural network to determine merged labels to identify candidate class mergers and to generate a merged segmentation mask.

In some embodiments, the transformer-based image segmentation system 102 trains the segmentation refinement neural network to generate an initial segmentation mask by segmenting a portrait into a plurality of semantic regions. A semantic region includes a portion of a digital visual media item that corresponds to a classification of an object or a part of object. For example, a semantic region includes a group of pixels sharing a common trait of depicting a portion of one or more instances of an object. To illustrate, a semantic region includes all pixels in a portrait belonging to hair, skin, clothing, etc. For instance, the transformer-based image segmentation system 102 divides the portrait into groups of pixels associated with particular classes. The transformer-based image segmentation system 102 generates the initial segmentation mask by identifying the pixels belonging to the particular classes.

Similarly, in some embodiments, the transformer-based image segmentation system 102 trains the segmentation refinement neural network to generate a refined segmentation mask by segmenting the portrait into a plurality of semantic regions. For instance, the transformer-based image segmentation system 102 divides the portrait into groups of pixels associated with particular classes. The transformer-based image segmentation system 102 generates the refined segmentation mask by identifying the pixels belonging to the particular classes. For example, the transformer-based image segmentation system 102 utilizes the initial segmentation mask as a starting point (e.g., with estimated probability values for pixel classifications) and refines the initial segmentation mask to generate the refines segmentation mask.

As described above, the transformer-based image segmentation system 102 further refines certain features of a refined segmentation mask to generate a feature refinement segmentation mask. For instance, FIG. 7 illustrates feature refinement segmentation masks in accordance with one or more embodiments. Specifically, FIG. 7 shows a digital visual media item 702 comprising a portrait of a person, a ground truth feature refinement segmentation mask 704 for the digital visual media item 702, and a feature refinement segmentation mask 706.

To illustrate feature refinement, FIG. 7 depicts the ground truth feature refinement segmentation mask 704, specifically focusing on the portrait subject's teeth. For instance, the ground truth feature refinement segmentation mask 704 comprises pixels with a value of 1 corresponding to pixels of the digital visual media item 702 that depict teeth, while the ground truth feature refinement segmentation mask 704 comprises pixels with a value of 0 corresponding to pixels of the digital visual media item 702 that do not depict teeth. Thus, in some embodiments, the transformer-based image segmentation system 102 trains the segmentation refinement neural network to further refine segmentation of teeth in a portrait. In some implementations, the transformer-based image segmentation system 102 trains the segmentation refinement neural network to further refine segmentations of other features, such as hair, eyes, beard, etc.

In some embodiments, the transformer-based image segmentation system 102 trains the segmentation refinement neural network to generate the feature refinement segmentation mask 706. For example, after generating an initial segmentation mask and a refined segmentation mask comprising classes (e.g., hair, skin, eyes, teeth, nose, etc.) for the digital visual media item 702, the transformer-based image segmentation system 102 further refines the refined segmentation mask by utilizing a feature refinement head (e.g., feature refinement head 516) to refine details of the portrait subject's teeth and generate the feature refinement segmentation mask 706.

Figure 8:
FIG. 8 illustrates an example digital visual media item, a corresponding refined segmentation mask, and a corresponding feature refinement segmentation mask for the digital visual media item in accordance with one or more embodiments.

As discussed above, the transformer-based image segmentation system 102, in one or more implementations, trains the segmentation refinement neural network to generate segmentation masks for digital visual media items, such as portraits. For instance, FIG. 8 illustrates segmentation masks in accordance with one or more embodiments. Specifically, FIG. 8 shows a digital visual media item 802 comprising a portrait of a person, a segmentation mask 804 for the digital visual media item 802 comprising multiple classes, and a feature refinement segmentation mask 806 for the digital visual media item 802 focusing on teeth.

To illustrate, the transformer-based image segmentation system 102 analyzes the digital visual media item 802 to predict probabilities for each pixel of the digital visual media item 802 belonging to one or more of the plurality of classes (e.g., 11 classes). The transformer-based image segmentation system 102 generates the segmentation mask 804 utilizing the initial segmentation head and the refinement segmentation head as described above. The transformer-based image segmentation system 102 analyzes the segmentation mask 804 to generate the feature refinement segmentation mask 806 utilizing the feature refinement head as described above. In some embodiments, the transformer-based image segmentation system 102 generates the feature refinement segmentation mask 806 by directly adjusting pixel values in the segmentation mask 804. In some embodiments, the transformer-based image segmentation system 102 generates the feature refinement segmentation mask 806 as a separate mask indicating locations of teeth pixels. (As noted above, the example of teeth is nonlimiting; in other embodiments, the transformer-based image segmentation system 102 focuses on other features to refine.) In some embodiments, the transformer-based image segmentation system 102 combines the segmentation mask 804 and the feature refinement segmentation mask 806 to generate a final segmentation mask comprising multiple classes and refined details from the feature refinement segmentation mask.

In some implementations, the transformer-based image segmentation system 102 utilizes a unified training strategy to generate feature refinement segmentation masks (e.g., as an alternative to utilizing a feature refinement head). For instance, the transformer-based image segmentation system 102 trains the segmentation refinement neural network by merging a first set of features with a second set of features in a first dataset. Then, the transformer-based image segmentation system 102 determines a first loss for the first dataset. Further, the transformer-based image segmentation system 102 merges all features except a third set of features in a second dataset, the third set of features analogous to the first set of features. Then, the transformer-based image segmentation system 102 determines a second loss for the second dataset. The transformer-based image segmentation system 102 compares the first loss with the second loss. In this way, the transformer-based image segmentation system 102 generates a feature refinement segmentation mask comprising an additional class (e.g., the third set of features, such as teeth).

To illustrate, the transformer-based image segmentation system 102, in one or more implementations, utilizes a training dataset comprising digital visual media items and ground truth segmentation masks, similar to the images depicted in FIG. 8. For example, the transformer-based image segmentation system 102 merges a first set of features (e.g., the subject's teeth in FIG. 8) with a second set of features (e.g., the subject's mouth in FIG. 8) in a first dataset (represented by the segmentation mask 804). Additionally, the transformer-based image segmentation system 102 merges all features except a third set of features (e.g., all features except the subject's teeth in FIG. 8) in a second dataset (represented by the feature refinement segmentation mask 806), wherein the third set of features is analogous to the first set of features (e.g., the subject's teeth in FIG. 8).

For each dataset, the transformer-based image segmentation system 102 determines a loss for comparison. In some embodiments, the transformer-based image segmentation system 102 utilizes a cross entropy loss. In some embodiments, the transformer-based image segmentation system 102 utilizes a dice loss. In some embodiments, the transformer-based image segmentation system 102 utilizes a cross entropy loss and a dice loss. In some embodiments, the transformer-based image segmentation system 102 utilizes a focal loss. In some embodiments, the transformer-based image segmentation system 102 utilizes a focal loss and a dice loss. In some embodiments, the transformer-based image segmentation system 102 utilizes an edge loss. In some embodiments, the transformer-based image segmentation system 102 utilizes an L1 loss.

To illustrate, the transformer-based image segmentation system 102 assigns n annotations $A^0, \ldots A^{n-1}$ (e.g., background, face, mouth, etc.) to data from the first dataset A, and two annotations $B^0, B^1$ (e.g., non-teeth and teeth) to data from the second dataset B. There is a relationship that $B^1 \subseteq^j$ (for example, "teeth" is part of "mouth" in the first dataset A, but is not annotated separately in the first dataset A). In the unified training strategy, the transformer-based image segmentation system 102 outputs a model C with n+1 output labels $C^0, \ldots C^j \ldots, C^{n-1}, C^n$ where $$C^i = \begin{cases} A^j - B^1, & (i = j) \\ B^1, & (i = n) \\ A^i, & \text{otherwise} \end{cases}$$

which merges "teeth" into the first dataset A labels, and assigns a new label (e.g., "inner mouth") to the "mouth other than teeth" region in the original first dataset A.

For the data from the first dataset A, the transformer-based image segmentation system 102 determines predicted logits according to:

$$pred_{logit}A^i = \begin{cases} logsumexp(pred_{logit}C^j, \ pred_{logit}C^n), & (i = j) \\ pred_{logit}C^i, & (i \neq j) \end{cases}$$

The vector $pred_{logit}A$ has n labels, which is the same dimension as the ground truth map A. The transformer-based image segmentation system 102 determines the loss as:

$$loss_A = loss(pred_{logit}A, gt_A)$$

For the data from the second dataset B, the transformer-based image segmentation system 102 determines predicted logits according to:

$$pred_{logit}B^i = \begin{cases} logsumexp(pred_{logit}C^0, \ ..., \ pred_{logit}C^{n-1}), & (i = 0) \\ pred_{logit}C^n, & (i = 1) \end{cases}$$

The vector $pred_{logit}B$ has 2 labels, which is the same dimension as the ground truth map B. The transformer-based image segmentation system 102 determines the loss as:

$$loss_B = loss(pred_{logit}B, gt_B)$$

By utilizing the unified training strategy, in some embodiments, the transformer-based image segmentation system 102 increases the extensibility of the segmentation refinement neural network to other datasets and to other classes (e.g., beyond the groups of classes discussed above, such as the 18 classes or the 11 classes). Thus, the transformer-based image segmentation system 102 is able to analyze data having different annotations.

As noted above, in some embodiments, the transformer-based image segmentation system 102 trains the segmentation refinement neural network by determining a random sample of simple digital images and complex digital images. The transformer-based image segmentation system 102 trains the segmentation refinement neural network using the random sample. In this way, by including both simple and complex images, in some cases, the transformer-based image segmentation system 102 is suitable for continuous learning. To illustrate, as new data is available for training the segmentation refinement neural network, the transformer-based image segmentation system 102 splits the new data into a training set and a testing set based on a complexity distribution for the new data.

In some implementations, the transformer-based image segmentation system 102 has been shown to improve accuracy over conventional systems. For example, the transformer-based image segmentation system 102 was tested on a testing dataset and compared with the Topformer model on the same dataset, utilizing an intersection over union (IoU) metric for accuracy across numerous semantic features (e.g., background, facial skin, iris and pupil, body skin, hair, lip, beard, sclera, eyebrow, mouth, and clothing). The IoUs across the numerous features were averaged to determine an average accuracy for each system. The transformer-based image segmentation system 102 had an average accuracy of 0.6431, while Topformer had an average accuracy of 0.6076.

Moreover, in some embodiments, the transformer-based image segmentation system 102 has an improved memory usage over conventional systems, rendering the transformer-based image segmentation system 102 suitable for use on a mobile device. In summary, the transformer-based image segmentation system 102 boosts performance in one or more of the following ways: 1) Reduces embedding dimension in the segmentation head 2) reduces input resolution 3) using series sum (acc sum) in segmentation head, which is to substitute concatenation with accumulate sum. In one or more implementations, the transformer-based image segmentation system 102 uses a combination of those strategies which reduces the memory from 2668 M to 749 M with less than 2 percent drop.

Figure 9:
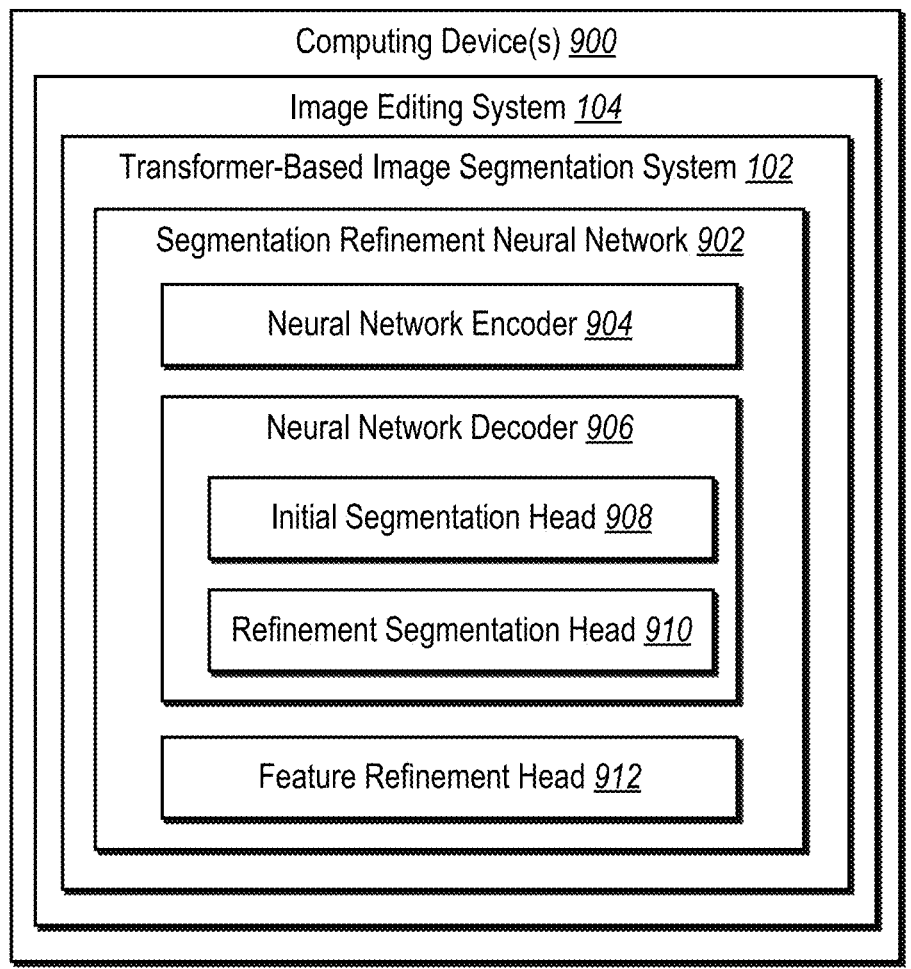
FIG. 9 illustrates a schematic diagram of an example architecture of a transformer-based image segmentation system in accordance with one or more embodiments.

Turning now to FIG. 9, additional detail will be provided regarding components and capabilities of one or more embodiments of the transformer-based image segmentation system 102. In particular, FIG. 9 illustrates an example transformer-based image segmentation system 102 executed by a computing device(s) 900 (e.g., the server devices(s) 106 or the client device 108). As shown by the embodiment of FIG. 9, the computing device(s) 900 includes or hosts the image editing system 104 and/or the transformer-based image segmentation system 102. Furthermore, as shown in FIG. 9, the transformer-based image segmentation system 102 includes a segmentation refinement neural network 902. Furthermore, the segmentation refinement neural network 902 includes a neural network encoder 904, a neural network decoder 906 having an initial segmentation head 908 and a refinement segmentation head 910, and a feature refinement head 912.

As mentioned, and as shown in FIG. 9, the transformer-based image segmentation system 102 includes a segmentation refinement neural network 902. The segmentation refinement neural network 902, in one or more implementations, generates features of a digital visual media item, generates initial segmentation masks for the digital visual media item, and generates refined segmentation masks for the digital visual media item. For example, as described above, the segmentation refinement neural network 902 encodes feature maps from the digital visual media item and decode the feature maps to generate segmentation masks.

In addition, as illustrated in FIG. 9, the transformer-based image segmentation system 102 includes a neural network encoder 904. The neural network encoder 904 encodes features from the digital visual media item. For instance, the neural network encoder 904 extracts features from the digital visual media item. To illustrate, as discussed above, the neural network encoder 904 generates low-level features and high-level features of the digital visual media item. Additionally, the neural network encoder 904 can downsample portions of the low-level features and transform the low-level features utilizing a transformer block.

Moreover, as shown in FIG. 9, the transformer-based image segmentation system 102 includes a neural network decoder 906. The neural network decoder 906 analyzes the features of the digital visual media item and generate segmentation masks for the digital visual media item. For example, as described above, the neural network decoder 906 generates an initial segmentation mask and a refined segmentation mask for the digital visual media item.

Further, FIG. 9 illustrates that the transformer-based image segmentation system 102 includes an initial segmentation head 908. The initial segmentation head 908 analyzes low-level features of a digital visual media item and generates an initial segmentation mask for the digital visual media item. To illustrate, the initial segmentation head 908 generates an initial segmentation mask for the digital visual media item by decoding low-level features of the digital visual media item. For instance, as described above, the initial segmentation head 908 up-samples portions of the low-level features, combines the low-level features (e.g., using a series sum operation), and generates an initial segmentation mask.

Additionally, as illustrated in FIG. 9, the transformer-based image segmentation system 102 includes a refinement segmentation head 910. The refinement segmentation head 910 can analyze high-level features of a digital visual media item and an initial segmentation mask to generate a refined segmentation mask for the digital visual media item. To illustrate, the refinement segmentation head 910 can generate a refined segmentation mask for the digital visual media item by decoding the initial segmentation mask and high-level features of the digital visual media item. For example, as discussed above, the refinement segmentation head 910 can generate refined high-level features, up-sample the refined high-level features, and combine the up-sampled refined high-level features (e.g., using a series sum operation) to generate a refined segmentation mask.

Moreover, FIG. 9 depicts that the transformer-based image segmentation system 102 includes a feature refinement head 912. The feature refinement head 912 generates a feature refinement segmentation mask. For instance, as described above, the feature refinement head 912 analyzes the refined segmentation mask and the high-level features to generate the feature refinement segmentation mask.

Each of the components 902-912 of the transformer-based image segmentation system 102 can include software, hardware, or both. For example, the components 902-912 can include one or more instructions stored on a computer-readable storage medium and executable by processors of one or more computing devices, such as a client device or server device. When executed by the one or more processors, the computer-executable instructions of the transformer-based image segmentation system 102 causes the computing device(s) 900 to perform the methods described herein. Alternatively, the components 902-912 include hardware, such as a special purpose processing device to perform a certain function or group of functions. Alternatively, the components 902-912 of the transformer-based image segmentation system 102 includes a combination of computer-executable instructions and hardware.

Furthermore, the components 902-912 of the transformer-based image segmentation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-912 are implementable as a stand-alone application, such as a desktop or mobile application. Furthermore, the components 902-912 are implementable as one or more web-based applications hosted on a remote server. The components 902-912 are implementable in a suite of mobile device applications or "apps." To illustrate, the components 902-912 are implementable in an application, including but not limited to ADOBE CHARACTER ANIMATOR, ADOBE CREATIVE CLOUD, ADOBE ELEMENTS, ADOBE LIGHTROOM, ADOBE LIGHTROOM MOBILE, ADOBE PHOTOSHOP, ADOBE PHOTOSHOP CAMERA, ADOBE PHOTOSHOP ELEMENTS, ADOBE PHOTOSHOP EXPRESS, ADOBE PHOTOSHOP LIGHTROOM, ADOBE PHOTOSHOP MOBILE, ADOBE PREMIERE ELEMENTS, ADOBE PREMIERE RUSH, and ADOBE SCAN. The foregoing are either registered trademarks or trademarks of Adobe Inc. in the United States and/or other countries.

FIGS. 1-9, the corresponding text, and the examples provide a number of different methods, systems, devices, and non-transitory computer-readable media of the transformer-based image segmentation system 102. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for generating segmentation masks of a digital visual media item in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1002 of generating high-level features of a digital visual media item, an act 1004 of generating low-level features of the digital visual media item, an act 1006 of generating an initial segmentation mask of the digital visual media item from the low-level features, and an act 1008 of generating a refined segmentation mask of the digital visual media item from the initial segmentation mask and the high-level features.

In particular, the act 1002 can include generating, utilizing a neural network encoder, high-level features of a digital visual media item, the act 1004 can include generating, utilizing the neural network encoder, low-level features of the digital visual media item, the act 1006 can include generating, utilizing a neural network decoder, an initial segmentation mask of the digital visual media item from the low-level features, and the act 1008 can include generating, utilizing the neural network decoder, a refined segmentation mask of the digital visual media item from the initial segmentation mask and the high-level features.

For example, in one or more embodiments, the series of acts 1000 includes wherein the neural network encoder comprises a transformer block; and further comprising: down-sampling a portion of the low-level features to match a dimension of a lower-level set of the low-level features; and generating a transformed set of features by passing the down-sampled portion of the low-level features through the transformer block.

In addition, in one or more embodiments, the series of acts 1000 includes decoding the low-level features, without the high-level features. Further, in some embodiments, the series of acts 1000 includes up-sampling a portion of the low-level features to match a dimension of a higher-level set of the low-level features; and combining the up-sampled portion of the low-level features with the higher-level set of the low-level features utilizing a series sum operation.

Moreover, in some embodiments, the series of acts 1000 includes decoding the initial segmentation mask and the high-level features by: generating, utilizing a multilayer perceptron, refined high-level features from the initial segmentation mask and the high-level features; up-sampling the refined high-level features; and combining the up-sampled refined high-level features. In one or more embodiments, the series of acts 1000 includes utilizing a concatenation operation. In one or more embodiments, the series of acts 1000 includes utilizing a series sum operation.

Additionally, in one or more embodiments, the series of acts 1000 includes generating, utilizing a feature refinement head, a feature refinement segmentation mask of the digital visual media item. Furthermore, in some embodiments, the series of acts 1000 includes segmenting a portrait into a plurality of semantic regions. Moreover, in some embodiments, the series of acts 1000 are performed on a mobile device. For example, in one or more embodiments, instructions stored on a non-transitory computer-readable medium cause a processor of a mobile device to perform the series of acts 1000.

In addition, in some embodiments, the series of acts 1000 includes generating, utilizing the segmentation refinement neural network, at least one refined segmentation mask for at least one digital visual media item. Further, in one or more embodiments, the series of acts 1000 includes training the segmentation refinement neural network by: merging a first set of features with a second set of features in a first dataset; determining a first loss for the first dataset; merging all features except a third set of features in a second dataset, the third set of features analogous to the first set of features; determining a second loss for the second dataset; and comparing the first loss with the second loss. In addition, in one or more embodiments, the series of acts 1000 includes determining at least one of a cross entropy loss, a dice loss, or a focal loss.

Moreover, in some embodiments, the series of acts 1000 includes determining a random sample of simple digital images and complex digital images; and training the segmentation refinement neural network using the random sample. In addition, in one or more embodiments, the series of acts 1000 includes utilizing a series sum of the initial segmentation mask and the high-level features to generate the refined segmentation mask.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
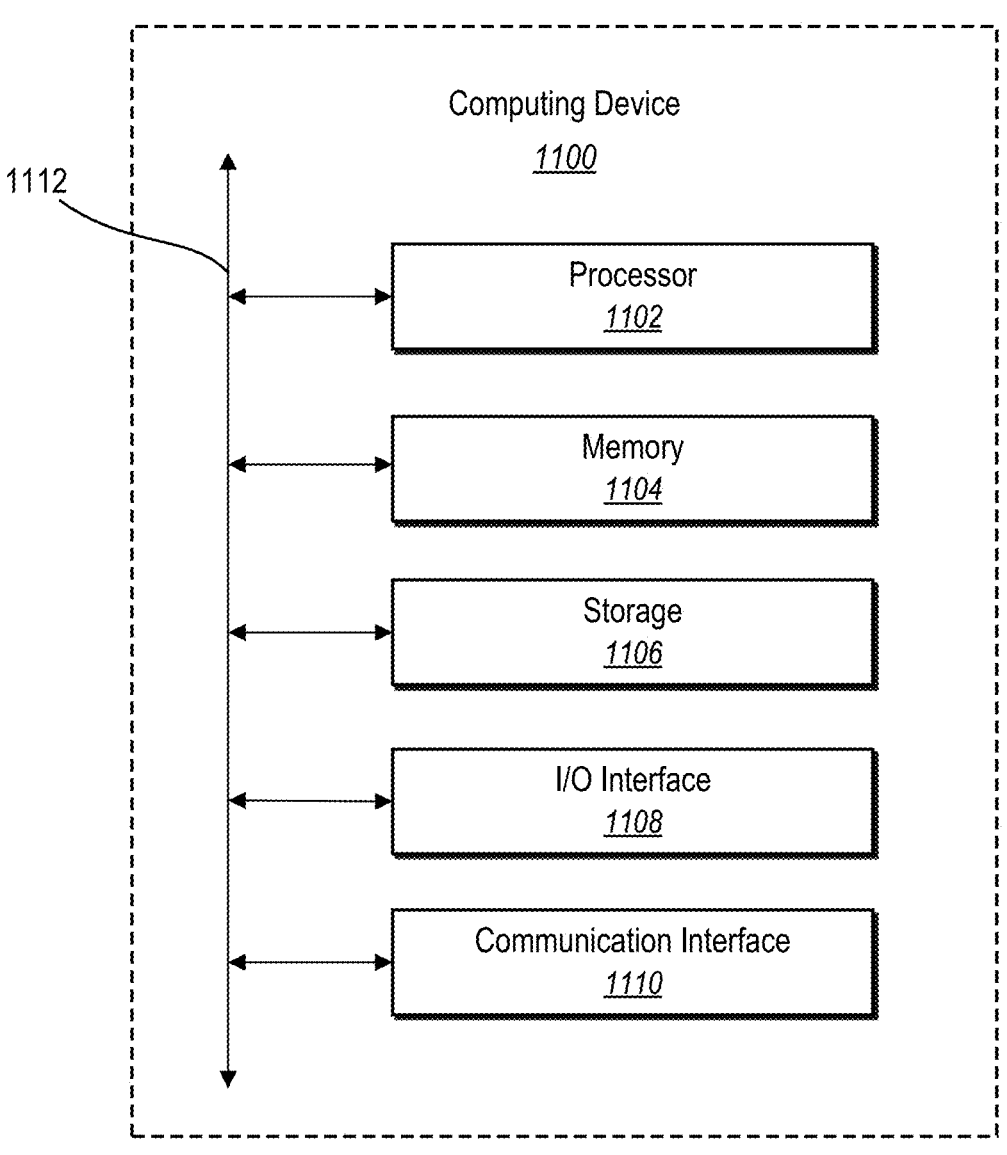
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., server device(s) 106, client device 108, computing device(s) 900). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes the memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes the storage device 1106 for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include the bus 1112. The bus 1112 can include hardware, software, or both that connects components of computing device 1100 to each other.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating, utilizing a neural network encoder, high-level features of a digital visual media item;
   generating, utilizing the neural network encoder, low-level features of the digital visual media item;
   generating, utilizing a neural network decoder, an initial segmentation mask of the digital visual media item from the low-level features; and
   generating, utilizing the neural network decoder, a refined segmentation mask of the digital visual media item by passing the initial segmentation mask and the high-level features through the neural network decoder.

2. The computer-implemented method of claim 1, wherein the neural network encoder comprises a transformer block; and further comprising:
   down-sampling a portion of the low-level features to match a dimension of a lower-level set of the low-level features; and
   generating a transformed set of features by passing the down-sampled portion of the low- level features through the transformer block.

3. The computer-implemented method of claim 1, wherein generating the initial segmentation mask of the digital visual media item from the low-level features comprises decoding the low-level features, without the high-level features.

4. The computer-implemented method of claim 3, further comprising:
   up-sampling a portion of the low-level features to match a dimension of a higher-level set of the low-level features; and
   combining the up-sampled portion of the low-level features with the higher-level set of the low-level features utilizing a series sum operation.

5. The computer-implemented method of claim 1, wherein generating the refined segmentation mask of the digital visual media item from the initial segmentation mask and the high-level features comprises decoding the initial segmentation mask and the high-level features by:
   generating, utilizing a multilayer perceptron, refined high-level features from the initial segmentation mask and the high-level features;
   up-sampling the refined high-level features; and
   combining the up-sampled refined high-level features.

6. The computer-implemented method of claim 5, wherein combining the up-sampled refined high-level features comprises utilizing a concatenation operation.

7. The computer-implemented method of claim 5, wherein combining the up-sampled refined high-level features comprises utilizing a series sum operation.

8. The computer-implemented method of claim 1, further comprising generating, utilizing a feature refinement head, a feature refinement segmentation mask of the digital visual media item.

9. The computer-implemented method of claim 1, wherein at least one of generating the initial segmentation mask or generating the refined segmentation mask comprises segmenting a portrait into a plurality of semantic regions.

10. The computer-implemented method of claim 1, wherein generating the initial segmentation mask and generating the refined segmentation mask are performed on a mobile device.

11. A non-transitory computer-readable medium storing instructions thereon that, when executed by at least one processor, cause the at least one processor to perform operations comprising:
   generating, utilizing a neural network encoder, high-level features of a digital visual media item;
   generating, utilizing the neural network encoder, low-level features of the digital visual media item;
   generating, utilizing a first segmentation head of a neural network decoder, an initial segmentation mask of the digital visual media item from the low-level features; and
   generating a refined segmentation mask of the digital visual media item by processing the initial segmentation mask and the high-level features utilizing a second segmentation head of the neural network decoder.

12. The non-transitory computer-readable medium of claim 11, wherein the neural network encoder comprises a transformer block; and wherein the operations further comprise:
   down-sampling a portion of the low-level features to match a dimension of a lower-level set of the low-level features; and
   generating a transformed set of features by passing the down-sampled portion of the low-level features through the transformer block.

13. The non-transitory computer-readable medium of claim 11, wherein generating the initial segmentation mask of the digital visual media item from the low-level features comprises decoding the low-level features without the high-level features.

14. The non-transitory computer-readable medium of claim 11, wherein the instructions cause a processor of a mobile device to perform the operations.

15. A system comprising:
   at least one processor; and
   at least one memory device coupled to the at least one processor that causes the system to perform operations comprising:
      generating, utilizing a neural network encoder, high-level features of a digital visual media item;
      generating, utilizing the neural network encoder, low-level features of the digital visual media item;
      generating, utilizing a neural network decoder, an initial segmentation mask of the digital visual media item from the low-level features; and
      generating, utilizing the neural network decoder, a refined segmentation mask of the digital visual media item by processing the initial segmentation mask and the high-level features through the neural network decoder.

16. The system of claim 15, wherein the neural network encoder comprises a transformer block; and further comprising:

down-sampling a portion of the low-level features to match a dimension of a lower-level set of the low-level features; and generating a transformed set of features by passing the down-sampled portion of the low-level features through the transformer block.

17. The system of claim 15, wherein generating the initial segmentation mask of the digital visual media item from the low-level features comprises decoding the low-level features, without the high-level features.

18. The system of claim 17, further comprising:

up-sampling a portion of the low-level features to match a dimension of a higher-level set of the low-level features; and combining the up-sampled portion of the low-level features with the higher-level set of the low-level features utilizing a series sum operation.

19. The system of claim 15, wherein generating the refined segmentation mask of the digital visual media item from the initial segmentation mask and the high-level features comprises decoding the initial segmentation mask and the high-level features by:

generating, utilizing a multilayer perceptron, refined high-level features from the initial segmentation mask and the high-level features;

up-sampling the refined high-level features; and combining the up-sampled refined high-level features.

20. The system of claim 19, wherein combining the up-sampled refined high-level features comprises utilizing a concatenation operation.

* * * * *